(12) United States Patent
Yanagawa et al.

(10) Patent No.: US 10,150,186 B2
(45) Date of Patent: Dec. 11, 2018

(54) BRAZING METHOD

(71) Applicant: UACJ Corporation, Tokyo (JP)

(72) Inventors: Yutaka Yanagawa, Tokyo (JP); Yasunaga Itoh, Tokyo (JP); Tomoki Yamayoshi, Tokyo (JP)

(73) Assignee: UACJ CORPORATION, Tokyo (JP)

( * ) Notice: Subject to any disclaimer, the term of this patent is extended or adjusted under 35 U.S.C. 154(b) by 0 days.

(21) Appl. No.: 15/533,869

(22) PCT Filed: Nov. 13, 2015

(86) PCT No.: PCT/JP2015/082035
§ 371 (c)(1),
(2) Date: Jun. 7, 2017

(87) PCT Pub. No.: WO2016/093017
PCT Pub. Date: Jun. 16, 2016

(65) Prior Publication Data
US 2017/0320170 A1    Nov. 9, 2017

(30) Foreign Application Priority Data

Dec. 11, 2014  (JP) .................................. 2014-250724

(51) Int. Cl.
*B23K 1/00* (2006.01)
*B23K 35/28* (2006.01)
(Continued)

(52) U.S. Cl.
CPC ............ *B23K 35/288* (2013.01); *B23K 1/00* (2013.01); *B23K 1/0012* (2013.01); *B23K 1/19* (2013.01);
(Continued)

(58) Field of Classification Search
CPC .............. B23K 1/0012; B23K 2201/14; B23K 2203/10; B23K 1/203; B23K 1/008; F28F 21/084; F28F 21/089; F28F 1/00
(Continued)

(56) References Cited

U.S. PATENT DOCUMENTS 3,807,033 A    4/1974 Schoer et al.
3,811,177 A    5/1974 Schoer et al.
(Continued)

FOREIGN PATENT DOCUMENTS

DE        19744734 A1     4/1999
DE    102008009695 A1     9/2008
(Continued)

OTHER PUBLICATIONS

English translation of International Search Report dated Feb. 16, 2016 for parent application No. PCT/JP2015/082035.
(Continued)

*Primary Examiner* — Erin B Saad
(74) *Attorney, Agent, or Firm* — J-TEK Law PLLC; Jeffrey D. Tekanic; Scott T. Wakeman

(57) ABSTRACT

A hollow aluminum structure that will be brazed includes at least one brazing sheet having a filler metal layer clad onto a core layer. The core layer is composed of aluminum or an aluminum alloy containing less than 0.2 mass % Mg. The filler metal layer is composed of an aluminum alloy that contains Si: 4.0-13.0 mass % and Bi: 0.01-0.3 mass %, and further contains Li: 0.004-0.08 mass % and/or Be: 0.006-0.12 mass %, the filler metal layer containing less than 0.1 mass % Mg. The hollow aluminum structure is assembled such that the filler metal layer is present at locations that will form both an interior-facing brazed joint and an exterior-facing brazed joint. Then, flux is applied onto the filler metal layer at the location that will form the exterior brazed joint,
(Continued)

and the hollow aluminum structure heated in an inert gas atmosphere to form the interior brazed joint and the exterior brazed joint.

20 Claims, 6 Drawing Sheets

(51) Int. Cl.
| | |
|---|---|
| B23K 1/19 | (2006.01) |
| B23K 1/20 | (2006.01) |
| B23K 31/02 | (2006.01) |
| B23K 35/22 | (2006.01) |
| C22C 21/00 | (2006.01) |
| B23K 35/02 | (2006.01) |
| C22C 21/02 | (2006.01) |
| F28F 21/08 | (2006.01) |
| F28F 3/02 | (2006.01) |
| F28F 1/02 | (2006.01) |
| B23K 101/14 | (2006.01) |

(52) U.S. Cl.
CPC .............. *B23K 1/20* (2013.01); *B23K 1/203* (2013.01); *B23K 1/206* (2013.01); *B23K 31/02* (2013.01); *B23K 35/0238* (2013.01); *B23K 35/22* (2013.01); *B23K 35/28* (2013.01); *B23K 35/286* (2013.01); *C22C 21/00* (2013.01); *C22C 21/02* (2013.01); *F28F 1/02* (2013.01); *F28F 3/025* (2013.01); *F28F 21/084* (2013.01); *B23K 2101/14* (2018.08); *F28F 2275/045* (2013.01)

(58) Field of Classification Search
USPC ..... 428/34.1; 228/262.51, 223, 183; 148/24, 148/23; 165/151, 179
See application file for complete search history.

(56) References Cited

U.S. PATENT DOCUMENTS

| | | |
|---|---|---|
| 3,853,547 A | 12/1974 | Singleton |
| 3,900,151 A | 8/1975 | Schoer et al. |
| 4,121,750 A | 10/1978 | Schoer et al. |
| 4,173,302 A | 11/1979 | Schultze et al. |
| 4,241,148 A | 12/1980 | Schoer et al. |
| 4,626,295 A | 12/1986 | Sasaki et al. |
| 4,645,119 A | 2/1987 | Haramaki et al. |
| 4,905,887 A | 3/1990 | Schoer et al. |
| 4,906,307 A | 3/1990 | Fujiyoshi |
| 4,991,647 A | 2/1991 | Kawabe et al. |
| 5,171,377 A | 12/1992 | Shimizu et al. |
| 5,232,788 A | 8/1993 | Timsit et al. |
| 5,316,206 A | 5/1994 | Syslak et al. |
| 5,418,072 A | 5/1995 | Baldantoni et al. |
| 5,450,666 A | 9/1995 | Conn et al. |
| 6,113,667 A | 9/2000 | Hyogo et al. |
| 6,234,243 B1 | 5/2001 | Murching et al. |
| 2001/0040180 A1 | 11/2001 | Wittebrood et al. |
| 2002/0005230 A1 | 1/2002 | Watsuji et al. |
| 2002/0012811 A1 | 1/2002 | Wittebrood et al. |
| 2002/0037425 A1 | 3/2002 | Mooij et al. |
| 2002/0086179 A1 | 7/2002 | Wittebrood |
| 2002/0102431 A1 | 8/2002 | Wittebrood et al. |
| 2003/0051342 A1 | 3/2003 | Hasegawa et al. |
| 2003/0084569 A1 | 5/2003 | Hyogo et al. |
| 2003/0091856 A1 | 5/2003 | Wittebrood |
| 2004/0009358 A1 | 1/2004 | Scott et al. |
| 2004/0028940 A1 | 2/2004 | Toyama |
| 2004/0121180 A1 | 6/2004 | Wittebrood et al. |
| 2004/0238605 A1 | 12/2004 | Nishimura et al. |
| 2005/0006065 A1 | 1/2005 | Katsumata et al. |
| 2005/0011636 A1* | 1/2005 | Miyachi .................. F28F 19/06 165/133 |
| 2005/0076506 A1 | 4/2005 | Kanada |
| 2005/0189047 A1 | 9/2005 | Hasegawa et al. |
| 2006/0000586 A1 | 1/2006 | Katsumata et al. |
| 2006/0102691 A1 | 5/2006 | Toyama |
| 2006/0231170 A1* | 10/2006 | Parson .................... C22C 21/00 148/437 |
| 2007/0017605 A1 | 1/2007 | Nakamura et al. |
| 2007/0158386 A1 | 7/2007 | Dulac et al. |
| 2007/0251091 A1 | 11/2007 | Minami et al. |
| 2008/0003451 A1 | 1/2008 | Suzuki et al. |
| 2008/0047683 A1 | 2/2008 | Takahashi |
| 2009/0165893 A1 | 7/2009 | Akazawa et al. |
| 2009/0233118 A1 | 9/2009 | Katoh et al. |
| 2010/0051247 A1 | 3/2010 | Sogabe et al. |
| 2010/0112370 A1 | 5/2010 | Ueda et al. |
| 2010/0116472 A1 | 5/2010 | Katsumata et al. |
| 2010/0266871 A1 | 10/2010 | Matsuo et al. |
| 2011/0114228 A1 | 5/2011 | Nakamura et al. |
| 2012/0145365 A1 | 6/2012 | Yamashita et al. |
| 2012/0177947 A1 | 7/2012 | Abrahamsson et al. |
| 2013/0118013 A1 | 5/2013 | Yamashita et al. |
| 2013/0299564 A1 | 11/2013 | Steiner et al. |
| 2013/0306714 A1 | 11/2013 | Wittebrood |
| 2014/0186560 A1 | 7/2014 | Katsumata et al. |
| 2015/0068713 A1 | 3/2015 | Sucke et al. |
| 2015/0118517 A1 | 4/2015 | Itoh et al. |
| 2015/0239071 A1 | 8/2015 | Kiga |
| 2015/0273635 A1 | 10/2015 | Kumagai et al. |
| 2016/0097607 A1 | 4/2016 | Katsumata et al. |
| 2016/0332209 A1 | 11/2016 | Yamashita et al. |
| 2017/0151637 A1 | 6/2017 | Ichikawa et al. |
| 2017/0205159 A1 | 7/2017 | Yamashita et al. |
| 2017/0205160 A1 | 7/2017 | Yanagawa et al. |

FOREIGN PATENT DOCUMENTS

| | | |
|---|---|---|
| EP | 0659519 A1 | 6/1995 |
| EP | 1127653 A2 | 8/2001 |
| EP | 1287934 A1 | 3/2003 |
| EP | 1430988 A1 | 6/2004 |
| EP | 1533070 A1 | 5/2005 |
| EP | 1679146 A1 | 7/2006 |
| EP | 2155431 A1 | 2/2010 |
| EP | 2323805 A1 | 5/2011 |
| EP | 2382087 A1 | 11/2011 |
| EP | 2418042 A1 | 2/2012 |
| EP | 2447662 A1 | 5/2012 |
| EP | 2578344 A1 | 4/2013 |
| JP | S53131253 A | 11/1978 |
| JP | S6182992 A | 4/1986 |
| JP | 61293699 | 12/1986 |
| JP | H01225736 A | 9/1989 |
| JP | H03124394 A | 5/1991 |
| JP | H03226396 A | 10/1991 |
| JP | H0525576 A | 2/1993 |
| JP | H07227695 A | 8/1995 |
| JP | H07303858 A | 11/1995 |
| JP | H0852565 A | 2/1996 |
| JP | H0985433 A | 3/1997 |
| JP | H1034375 A | 2/1998 |
| JP | H1034378 A | 2/1998 |
| JP | H1180870 A | 3/1999 |
| JP | H11183085 A | 7/1999 |
| JP | H11221696 A | 8/1999 |
| JP | H11285817 A | 10/1999 |
| JP | H11335764 A | 12/1999 |
| JP | H11347783 | 12/1999 |
| JP | 2000063970 A | 2/2000 |
| JP | 2000167688 A | 6/2000 |
| JP | 2000202620 A | 7/2000 |
| JP | 2000202680 A | 7/2000 |
| JP | 2000225461 A | 8/2000 |
| JP | 2000317673 A | 11/2000 |
| JP | 3160099 B2 | 4/2001 |
| JP | 2002079370 A | 3/2002 |
| JP | 2002161323 A | 6/2002 |
| JP | 2002267382 A | 9/2002 |

(56) References Cited

FOREIGN PATENT DOCUMENTS

| | | |
|---|---|---|
| JP | 200394165 A | 4/2003 |
| JP | 2003126986 A | 5/2003 |
| JP | 2004025297 A | 1/2004 |
| JP | 2004042086 A | 2/2004 |
| JP | 2004076057 A | 3/2004 |
| JP | 2005060790 A | 3/2005 |
| JP | 2006043735 A | 2/2006 |
| JP | 2006175500 A | 7/2006 |
| JP | 2006213934 A | 8/2006 |
| JP | 2006255755 A | 9/2006 |
| JP | 2006307292 A | 11/2006 |
| JP | 2006348372 A | 12/2006 |
| JP | 2007039753 A | 2/2007 |
| JP | 2007044713 A | 2/2007 |
| JP | 2007512143 A | 5/2007 |
| JP | 2007178062 A | 7/2007 |
| JP | 2007216283 A | 8/2007 |
| JP | 2007260733 A | 10/2007 |
| JP | 2008100283 A | 5/2008 |
| JP | 2008121108 A | 5/2008 |
| JP | 2008208416 A | 9/2008 |
| JP | 2008261025 A | 10/2008 |
| JP | 2009058139 A | 3/2009 |
| JP | 2009058167 A | 3/2009 |
| JP | 2009068083 A | 4/2009 |
| JP | 2009106947 A | 5/2009 |
| JP | 2009142870 A | 7/2009 |
| JP | 2009184017 A | 8/2009 |
| JP | 2010075965 A | 4/2010 |
| JP | 2010075966 A | 4/2010 |
| JP | 2010247209 A | 11/2010 |
| JP | 2010255014 A | 11/2010 |
| JP | 2011000614 A | 1/2011 |
| JP | 2011136358 A | 7/2011 |
| JP | 2011247459 A | 12/2011 |
| JP | 2012067994 A | 4/2012 |
| JP | 2013189659 A | 9/2013 |
| JP | 2013233552 A | 11/2013 |
| JP | 2014050861 A | 3/2014 |
| JP | 2014226704 A | 12/2014 |
| WO | 2016017716 A1 | 2/2016 |

OTHER PUBLICATIONS

English translation of Written Opinion dated Feb. 16, 2016 for parent application No. PCT/JP2015/082035.
Unpublished U.S. Appl. No. 15/385,342.
"Aluminum-Magnesium-Silicon (6000) Alloys", published May 2003, found at: http://www.totalmateria.com/Article74.htm.
Brazing of Stainless Steel to Aluminium for Pots and Pans Production, Oct. 2010, webpage found at: http://www.aluminium-brazing.com/2010/10/.
Elkem Bremanger, Result Analysis Report for Silgrain 10 micron dated Aug. 20, 2008.
J.R. Davis, "Aluminum and Aluminum Alloys", Pages from the third edition of ASM Specialty Handbook, ASM International, 1993.
Malvern White Paper entitled "A Basic Guide to Particle Characterization", 2015, webpage found at: http://www.malvern.com/en/support/resource-center/Whitepapers/WP120620BasicGuidePartChar.aspx.
Nocolok® Sil Flux fg brochure, 2015, webpage found at: http://www.aluminium-brazing.com/sponsor/nocolok/Files/PDFs/31360.pdf.
Unpublished U.S. Appl. No. 15/572,945.
Communication from European Patent Office dated Jun. 21, 2018 in counterpart EP application No. 15867796, Including Search Opinion, Search Report and examined claims 1-7.

* cited by examiner

BRAZING METHOD

CROSS-REFERENCE

This application is the US national stage of International Patent Application No. PCT/JP2015/082035 filed on Nov. 13, 2015, which claims priority to Japanese Patent Application 2014-250724 filed on Dec. 11, 2014

TECHNICAL FIELD

The present invention relates to a brazing method of aluminum material.

BACKGROUND ART

Having various advantages such as high thermal conductivity, lightweightness, etc., aluminum materials are widely used in heat exchangers and the like. For example, a heat exchanger mounted on an automobile includes components such as a tank, a tube and a fin, which are made of pure aluminum or an aluminum alloy, and these components are joined by brazing. Further, for brazing aluminum materials, a brazing sheet, on which a brazing filler material is clad at least on one side of an aluminum alloy sheet, is often used. Because the brazing sheet makes it possible to collectively braze a large number of components, the overall brazing process can be easily shortened and simplified.

As brazing methods for aluminum material, a vacuum brazing method and the NOCOLOK® flux brazing process were previously known. The vacuum brazing method is a brazing technique in which a brazing filler material composed of an Al—Si—Mg (Aluminum-Silicon-Magnesium) based alloy is used and an object to be processed is heated and brazed in a heating chamber of a brazing furnace under reduced pressure. In the vacuum brazing method, because an oxide film present on the surface of the aluminum material is broken up by Mg during brazing, a brazed joint can be formed without using flux. However, in the vacuum brazing method, it is necessary to use a vacuum brazing furnace configured to be able to reduce the pressure within the brazing chamber. Because a vacuum brazing furnace is expensive as compared to a common brazing furnace, when brazing is performed according to the vacuum brazing method, it has been problematic in that a reduction of the manufacturing cost is difficult.

On the other hand, the NOCOLOK® flux brazing process is a brazing technique in which a brazing filler material composed of an Al—Si based alloy is used, and after applying a fluoride-based flux onto the filler material, an object to be processed is heated and brazed in an inert-gas atmosphere. In the NOCOLOK® flux brazing process, a common brazing furnace can be used for the brazing. However, in the NOCOLOK® flux brazing process, if the flux application amount is insufficient, oxide films cannot be broken up sufficiently by the flux, which may cause degradation in brazeability, thereby leading to possible brazing failures in some cases. Moreover, when flux is not applied, brazing cannot be performed.

Brazing failures due to an insufficiency or lack of flux tend to occur, e.g., in the brazing of an object having a hollow portion, such as a tube of a heat exchanger, when the flux is applied after assembling the object to be processed. For that reason, flux is conventionally applied in advance to the entire surface of the aluminum material constituting the object to be processed to prevent the flux from being insufficient or lacking, which is problematic in that the brazing process becomes complicated.

Thus, as a method in which brazing can be performed according to a simple manufacturing process without using an expensive vacuum brazing furnace, a method of performing brazing in an inert gas atmosphere has been proposed that utilizes the function of Mg to break up oxide films. For example, in Patent Document 1, a method of performing brazing in an inert gas atmosphere has been proposed that uses a brazing sheet which includes a brazing filler material composed of an Al—Si based alloy and in which Mg is added at least to a brazing sheet-constituting layer other than the brazing filler material. According to this method, by forming a hollow structure such that the brazing filler material clad surface faces the interior, brazing can be performed without applying any flux onto the interior of the hollow structure.

PRIOR ART DOCUMENT

Patent Document

Patent Document 1: JP-A-2004-25297

SUMMARY OF THE INVENTION

A method of performing brazing in an inert gas atmosphere without using any flux is problematic in that brazeability easily degrades when the oxygen concentration in the atmosphere increases. For that reason, when this method is applied in a mass-production facility, there is a risk that the quality of the brazed joint(s) will degrade depending on the shape and the structure of the object to be processed, and the location(s) at which the brazed joint(s) is (are) formed.

For example, when performing brazing of a hollow structure as in Patent Document 1, because the atmosphere outside of the hollow structure is impeded from flowing into the hollow portion of the hollow structure, a low oxygen concentration state can be maintained relatively easily. Therefore, if the brazing filler remains in the hollow portion, a satisfactory brazed joint can be formed without using flux. However, because the oxygen concentration inside the brazing furnace fluctuates owing to various factors, it is difficult to maintain a low oxygen concentration state outside of the hollow structure. Consequently, if the brazing filler is exposed on the exterior of the hollow structure during brazing, the brazeability on the exterior side of the hollow structure tends to degrade. Furthermore, when the hollow structure has a structure that permits brazing filler to flow between the interior and the exterior of the hollow portion, the brazing filler tends to collect inside the hollow portion, which excels in brazeability. Therefore, there is a risk that the brazing filler will become insufficient on the exterior side of the hollow structure, where brazeability is inferior, and thereby brazing failures such as tearing of fillets will occur.

To address such a problem, a method that applies a flux to the exterior of the hollow structure and improves the brazeability on the exterior side is conceivable. However, a fluoride-based flux is problematic in that it reacts with Mg contained in the brazing filler and consumes Mg, thereby deteriorating the effect of breaking up the oxide films. Therefore, if the flux application amount is not sufficient, there is a risk that the brazeability on the exterior side of the hollow structure will not be improved sufficiently. On the other hand, if the flux application amount is increased in order to improve the brazeability on the exterior side of the hollow structure, there is a risk that the flux will melt and penetrate through the brazing filler into the interior of the hollow structure during brazing, thereby degrading the brazeability of the interior of the hollow structure.

As described above, methods of performing brazing in an inert gas atmosphere without using any flux still have room for improvement when applied in a mass-production facility. Therefore, there is a strong demand for a technique capable of forming (a) satisfactory brazed joint(s) irrespective of the shape and the structure of the object to be processed and the location(s) at which the brazed joint(s) is (are) formed.

The present invention has been made in view of such a background, and it is intended to provide a brazing method that can be readily applied in a mass-production facility, can easily simplify the manufacturing process and can stabilize the quality of (a) brazed joint(s).

One aspect of the present invention is a brazing method for brazing an object to be processed, which is composed of an aluminum material and has a hollow portion, collectively at an inner join part that faces the hollow portion and at an outer join part that faces an external space, the method including:

preparing the object to be processed that includes a brazing sheet including: a core layer having a chemical composition in which the content of Mg is restricted to less than 0.2% (mass %, likewise hereinbelow), the remainder being composed of Al and unavoidable impurities; and a filler metal layer having a chemical composition that indispensably contains Si: 4.0 to 13.0% and Bi: 0.01 to 0.3%, and further contains one or two from among Li: 0.004 to 0.08% and Be: 0.006 to 0.12%, the Mg content being restricted to less than 0.1% and the remainder being composed of Al and unavoidable impurities, the filler metal layer being clad onto at least one side of the core layer;

assembling the object to be processed such that the filler metal layer is present at both the inner join part and the outer join part;

next, applying a flux onto the filler metal layer that is present at the outer join part; and subsequently, heating and brazing the object to be processed in an inert gas atmosphere.

In the above-mentioned brazing method, the object to be processed includes an inner join part that faces a hollow portion and an outer join part that faces an external space. Because the inner join part faces the hollow portion into which the atmosphere of the external space is impeded from flowing, a low oxygen concentration state in the atmosphere can be easily maintained. Therefore, the inner join part is easily be brazed without using flux. On the other hand, because the oxygen concentration in the atmosphere at the outer join part that faces the external space tends to fluctuate, it is necessary to use a flux for brazing. As mentioned above, the object to be processed has two kinds of join parts that differ in the methods that are suitable for brazing them.

With regard to this, the brazing sheet to be used for brazing the object to be processed includes the core layer and the filler metal layer, in which the Mg contents are restricted in both to less than the specified amounts. Consequently, the brazing sheet can reduce the consumption of flux due to a reaction with Mg, and can improve the brazeability of the outer join part by using the flux. Thus, by applying the flux only onto the filler metal layer that is present in the outer join part, the brazing method makes it possible to form a satisfactory brazed joint at the outer join part where the oxygen concentration in atmosphere tends to fluctuate.

Moreover, the filler metal layer contains at least one of Li (lithium) and Be (beryllium), and Bi (bismuth). Li and Be function to break up the oxide films on the surface of an aluminum material. In addition, Bi has the effect of promoting the break-up of the oxide films by Li and Be. Consequently, the brazing sheet makes it possible to form a satisfactory brazed joint at the inner join part, where a low oxygen concentration state can be stably maintained, without using any flux.

As a result, the brazing method makes it possible to form satisfactory brazed joints collectively at both the outer join part and the inner join part, which differ in the conditions for forming a satisfactory brazed joint, and to stabilize the quality of the brazed joints. Moreover, because the brazing method makes it possible to perform brazing of the outer join part, where the oxygen concentration tends to fluctuate, by using flux, it is not necessary to strictly control the oxygen concentration. Therefore, the brazing method can be readily applied in a mass-production facility. In addition, because the brazing method does not require flux to be applied to the inner join part, it is not necessary to apply flux in advance before assembling the object to be processed. Consequently, the brazing method easily makes it possible to simplify the brazing manufacturing process.

DETAILED DESCRIPTION

Figure 1:
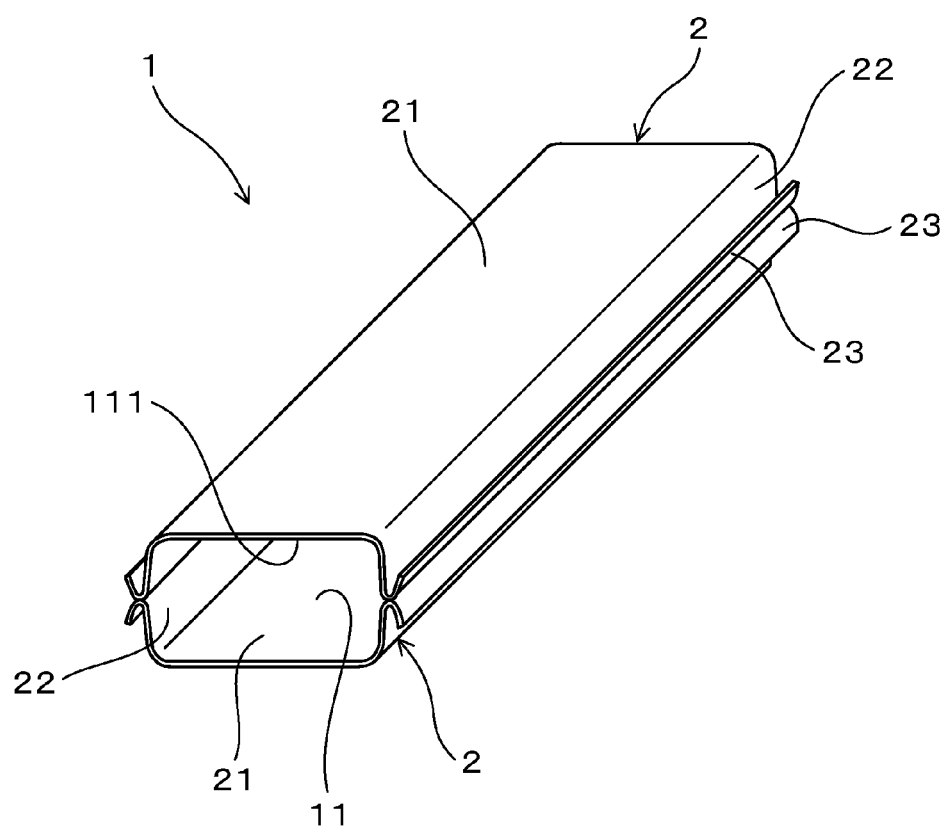
FIG. 1 is a perspective view of an object to be processed prior to brazing according to Example 1.

In the above-mentioned brazing method, the object to be processed includes at least the brazing sheet itself. That is, the object to be processed may be constituted from only one or more brazing sheets, or may further include one or more other components to be brazed with the brazing sheet.

When an object to be processed includes "other component(s)" other than the brazing sheet, the material(s) for the other component(s) may be appropriately selected from pure aluminum or aluminum alloys in consideration of the required mechanical properties, corrosion resistance, and manufacturability. From the viewpoint of preventing degradation in brazeability due to Mg, the other component(s) preferably has (have) a content of Mg of 0.2% or less.

The brazing method makes it possible to form satisfactory brazed joints collectively at both the outer join part and the inner join part in either situation in which the object to be processed has a structure that does not permit the filler metal to flow between the outer join part and the inner join part and in which the object to be processed has a structure that permits the filler metal to flow therebetween. That is, the brazing method can improve the brazeability of an outer join part by using a flux as described above. Therefore, when brazing an object to be processed having a structure that does not permit filler metal to flow between the outer join part and the inner join part, satisfactory brazed joints can be formed by the filler metal of each of the outer join part and the inner join part.

Moreover, when brazing an object to be processed having a structure that permits filler metal to flow between the outer join part and the inner join part, brazeability of the outer join part can be improved by use of a flux. As a result, it is possible to prevent filler metal from collecting at the inner join part. Therefore, the brazing method makes it possible to supply a sufficient amount of filler metal to both the outer join part and the inner join part when brazing an object to be processed having the above-mentioned structure, and to form satisfactory brazed joints at both parts.

Further, because the brazing method can reduce the consumption of flux due to Mg, as described above, the flux application amount at the outer join part can be reduced more than in the past. Further, as described below, Li scarcely reacts with the flux during brazing, and Be does not react at all with the flux. Therefore, when brazing an object to be processed having the above-mentioned structure, the brazing method makes it possible to avoid degradation in brazeability of the inner join part, for example, in the event that the flux applied to the outer join part seeps out to the inner join part for some reason.

As a result, the brazing method makes it possible to form (a) satisfactory brazed joint(s) even in an object to be processed having a structure that permits filler metal to flow between an outer join part and an inner join part.

In the brazing method, a conventionally known inert gas can be used as the inert gas. From the viewpoint of application to a mass-production facility, it is preferable to use nitrogen, argon, or a mixture of nitrogen and argon. To improve brazeability, the oxygen concentration in the inert gas is preferably on the low side. Specifically, the oxygen concentration in the inert gas is preferably 100 ppm or less, and more preferably 50 ppm or less. By lowering the oxygen concentration in the inert gas, the effect of reducing the flux application amount can be achieved. Such an oxygen concentration can be readily implemented by using an atmosphere furnace for flux brazing that has been conventionally used.

The heating temperature during brazing is preferably 585 to 620° C., and more preferably 590 to 610° C. If the heating temperature is less than 585° C., then the fluidity of filler metal is low, which could impair the brazeability. If the heating temperature is more than 620° C., then erosion that melts the core layer of the brazing sheet and/or a portion of the opposing material occurs, and consequently there will be a risk of failures. In addition, to prevent unnecessary oxidation of the object to be processed while the temperature is rising, the temperature-rise rate is preferably on the fast side until the temperature reaches a prescribed heating temperature.

The brazing method can be suitably used in the manufacture of, for example, a heat exchanger. A heat exchanger is constituted from a large number of components such as a fin (fins), a tube (tubes), and a header (headers), with a large number of hollow portions, for example, inside of the tubes, and between the fins and tubes. For that reason, conventionally, after flux is applied to these components, these components are assembled into a prescribed configuration, which has been problematic in terms of its very poor manufacturability. In contrast, the brazing method makes it possible to collectively form satisfactory brazed joints at both the outer join part and the inner join part by applying flux to the outer join part after the fin(s), etc. have been assembled into the prescribed configuration. Therefore, there is no need to apply flux to the components in advance, and manufacturability can be improved.

[Brazing Sheet]

The brazing sheet to be used in the brazing method includes a core layer, and a filler metal layer that is clad onto at least one side of the core layer. Hereinafter, chemical compositions of the core layer and the filler metal layer will be described in detail.

<Filler Metal Layer>

The filler metal layer has a chemical composition that indispensably contains Si: 4.0 to 13.0% and Bi: 0.01 to 0.3%, and further contains one or two from among Li: 0.004 to 0.08% and Be: 0.006 to 0.12%, the Mg content being restricted to less than 0.1% and the remainder being composed of Al and unavoidable impurities.

Si: 4.0 to 13.0%

By setting the Si content to 4.0 to 13.0%, it is possible to supply a sufficient amount of the filler metal to the join part(s). If the Si content is less than 4.0%, problems such as insufficiency of the supply amount of the filler metal, reduction of the fluidity of the filler metal, etc. may occur, thereby degrading the brazeability. On the other hand, if the Si content is more than 13.0%, then an excessive amount of filler metal may be supplied, and there is a risk that the dissolved amount of the core layer will be excessive. Moreover, in such a case, there is a risk that the melting temperature of the filler metal layer will be excessively high. As a result, the brazeability may degrade.

Bi: 0.01 to 0.3%

Bi functions to make the oxide film present on the surface of aluminum material fragile. Thus, by making Bi coexisting with Li or Be, breakup of the oxide film by Li or Be is promoted, thereby improving the brazeability. In addition, because Bi acts to decrease the surface tension of the filler metal, the filler metal tends to flow readily into fine gaps in the object to be processed. As a result, the reliability of the brazed joint can be improved.

By setting the Bi content to 0.01 to 0.3%, the above-mentioned effect can be attained sufficiently, thereby improving the brazeability of the inner join part. From the same viewpoint, the Bi content is preferably 0.01 to 0.03%. If the Bi content is less than 0.01%, then there is a risk that the above-mentioned effects will not be sufficiently obtained, and thus the brazeability of the inner join part may degrade. On the other hand, if the Bi content is more than 0.3%, it is difficult to obtain the effect of improving brazeability commensurate with the amount of Bi. In addition, if the Bi content is large, there is a risk that the surface of the filler metal layer will become discolored, and the brazeability will degrade in some cases.

Li: 0.004 to 0.08%, Be: 0.006 to 0.12%

Either one of Li and Be may be contained in the filler metal layer, or both of Li and Be may be contained in the filler metal layer. Li and Be function to break up the oxide film present on the surface of the aluminum material, thereby improving the brazeability. Moreover, the Li scarcely reacts with flux, and the Be does not react at all with the flux. Therefore, filler metal including Li and Be scarcely impairs the effect of the flux.

The mechanism by which Li and Be break up the oxide film is not clear at the present time, but it is believed that the oxide film is broken up by the following mechanism. It is believed that, because both Li and Be are elements that oxidize more easily than Al, they can scavenge oxygen from the oxide films present on the surfaces of the object to be processed. And, it is believed that the oxygen-scavenged oxide film becomes more fragile as compared to before oxide scavenging, thereby generating cracks in the oxide film which cause the oxide film to be broken up.

Moreover, Be scavenges oxygen from the oxide film on the surface of aluminum material to form an oxide. This Be oxide is believed to act to cover the surface of filler metal during brazing, thus preventing oxidation of the filler metal.

By setting the Li content to 0.004 to 0.08%, the above-mentioned effect can be attained sufficiently, thereby improving the brazeability of the inner join part. From the same viewpoint, the Li content is preferably 0.006 to 0.04%. If the Li content is less than 0.004%, the effect of the oxide film being broken up becomes insufficient, and there is a risk that brazeability of the inner join part will degrade. Moreover, if the Li content is more than 0.08%, Li oxides grow on the surface of the filler metal layer of the brazing sheet, and there is a risk that such Li oxides will lead to degradation in brazeability.

By setting the Be content to 0.006 to 0.12%, the above-mentioned effect can be attained sufficiently, thereby improving the brazeability of the inner join part. From the same viewpoint, the Be content is preferably 0.008 to 0.04%. If the Be content is less than 0.006%, the effect of the oxide films being broken up becomes insufficient, and there is a risk that brazeability of the inner join part will degrade. Moreover, if the Be content is more than 0.12%, Be oxides grow on the surface of the filler metal layer of the brazing sheet, there is a risk that such Be oxides lead to degradation in brazeability.

Mg: Less than 0.1%

Mg reacts with the flux and thereby consumes the flux, thereby degrading the brazeability of the outer join part. In addition, the reaction products of Mg with the flux decrease the fluidity of the filler metal, thereby degrading brazeability. From the viewpoint of avoiding these problems, the Mg content in the filler metal layer needs to be restricted to less than 0.1%. From the same viewpoint, the Mg content is preferably as low as possible, and more preferably restricted to 0.05% or less.

The above-mentioned filler metal layer may contain, besides Si, Bi, Li, and Be as described above, one or more kinds selected from a group consisting of Sr (strontium): 0.002 to 0.05%, Sb (antimony): 0.003 to 0.07%, Fe (iron): 0.05 to 0.8%, Mn (manganese): 0.05 to 0.2%, and Ti (titanium): 0.01 to 0.15%. By setting the contents of these elements in the filler metal layer to within the above-specified ranges, the fluidity of the filler metal can be adjusted, and the brazeability can be further improved.

Moreover, the filler metal layer may further contain one or two kinds from among Cu (copper): 0.5 to 5.0%, and Zn (zinc): 0.9 to 6.0%. By setting the contents of these elements in the filler metal layer within the above-specified ranges, the electric potential of the filler metal layer can be adjusted, and the corrosion resistance of the brazing sheet can be further improved.

<Core Layer>

Mg: Less than 0.2%

The core layer of the brazing sheet has a chemical composition in which the Mg content is restricted to less than 0.2% (in mass %, likewise hereinbelow) and the remainder is composed of Al and unavoidable impurities. Mg in the core layer diffuses into the filler metal owing to the heating during brazing, and reacts with the flux in the same way as described above, thereby causing a problem such as reduction of the fluidity of the filler metal. From the viewpoint of avoiding these problems, the Mg content in the core layer needs to be restricted to less than 0.2%. From the same viewpoint, the Mg content is preferably as low as possible.

Mn: 0.05 to 1.3%, Si: 1.0% or Less, Fe: 1.0% or Less, Cu: 0.9% or Less, Zn: 6.5% or Less, Ti: 0.2% or Less, and Zr (Zirconium): 0.5% or Less The core layer may further contain one, two or more from among Mn: 0.05 to 1.3%, Si: 1.0% or less, Fe: 1.0% or less, Cu: 0.9% or less, Zn: 6.5% or less, Ti: 0.2% or less, and Zr: 0.5% or less. By adding these elements in the core layer, the strength and the corrosion resistance of the brazing sheet can be increased. It is noted that, if the content of these elements becomes excessively large, there is a risk that the brazing sheet will tend to break in the rolling process when the brazing sheet being prepared.

The brazing sheet may be subjected in advance to etching of an oxide film present on the surface of the filler metal layer. By performing etching on the brazing sheet, the thickness of the oxide film on the surface of the filler metal layer can be reduced. As a result, the oxide film can be broken up more easily by a flux and Li, etc., thereby further improving the brazeability. To sufficiently attain such effect, it is preferable to reduce the thickness of the oxide film on the surface of the filler metal layer to 5 nm or less by etching.

Representative methods of the above-described etching include immersing the brazing sheet in an acid or an alkali, or the like. Specifically, as the acid, a diluted solution of hydrofluoric acid, a diluted solution of a mixture of hydrofluoric acid and nitric acid, a diluted solution of a mixture of phosphoric acid and sulfuric acid, or the like can be used. In addition, as the alkali, a solution of caustic soda or the like can be used.

In addition, it is preferable to apply an oil solution, the thermal decomposition temperature of which is 380° C. or lower in an inert gas, to the surface of the filler metal layer after the etching described above. In this case, because oxidation of the surface of the filler metal layer can be prevented by the oil solution, the improved brazeability achieved by performing the etching can be maintained over a long term.

Moreover, because the above-described oil solution readily decomposes while the temperature is rising when brazing is performed, it tends not to remain on the surfaces of the object to be processed at the brazing temperature. Therefore, even if brazing starts while some of the oil solution is still adhered to the surfaces of the object to be processed, there is little risk of the loss of brazeability. Accordingly, by using such an oil solution, the effect of maintaining satisfactory brazeability can be achieved while eliminating a degreasing treatment, thereby further simplifying the brazing process.

An oil solution having a thermal decomposition temperature of higher than 380° C. tends not to be decomposed by the heating during brazing, and there is a risk that the oil solution will scorch the surface of the object to be processed in some cases. As a result, the brazeability may degrade.

[Flux]

In the brazing method, a flux is applied to the filler metal layer present at the outer join part that faces the external space of the object to be processed. As the flux, for example, a conventionally used K—Al—F (potassium fluoroaluminates) based flux can be used. It is noted that, in the brazing method, it is not necessary to positively apply a flux to the inner join part that faces the hollow portion; however, the brazeability will not degrade even if flux is applied to the inner join part.

The flux application amount to the filler metal layer present at the outer join part is preferably 0.5 to 7.0 g/m$^2$, more preferably 0.5 to 4.5 g/m$^2$, and further preferably 0.5 to 3.5 g/m$^2$. By controlling the flux application amount to be within the above-specified range, a satisfactory brazed joint can be easily formed while avoiding excessive use of flux, and it is possible to avoid an impairment of the external-appearance quality after brazing.

If the flux application amount is less than 0.5 g/m$^2$, there is a risk that the oxide film will not be sufficiently broken up by the flux. Moreover, in some cases, there is also a risk of excessive progress in oxidation on the surface of the outer join part during brazing. This may result in degradation in brazeability of the outer join part. On the other hand, if the flux application amount is more than 7.0 g/m$^2$, it is difficult to obtain the effect of improving brazeability commensurate with the application amount. Moreover, in some cases, the flux amount may be excessively large, which could lead to an impairment of external appearance quality after brazing, and surface treatability.

Here, the flux application amount is a value calculated by dividing the amount of flux applied to the filler metal layer by the flux application surface area. That is, the brazing method permits application unevenness in the filler metal layer locally including regions on which a large amount of flux is applied, and regions on which a small amount of flux is applied.

Conventionally, when the brazing was collectively performed on an object to be processed having a hollow portion, it was difficult to reduce the flux application amount because the flux is consumed by Mg as described above. However, when the flux application amount was made excessively large, such problems occurred, that excessive flux caused waste, or that the amount of flux residue adhered to the object to be processed after brazing became large, leading to an impairment of the external-appearance quality. Therefore, to prevent the flux from being excessive, it is necessary to apply the flux as uniformly as possible.

With regard to this, because the brazing method makes it possible to prevent the consumption of flux due to Mg, it is possible to reduce the application amount of flux more than in the past. Further, even if an application unevenness of flux exists on the filler metal layer, the brazeability can be improved.

Preferably, in the flux, the content of a binder, the thermal decomposition temperature of which is 500° C. or lower in an inert gas, is restricted to 20 mass % or less. The binder is used to uniformly apply the flux in conventional brazing methods. However, the binder is thermally decomposed by the heating during brazing, thus causing a problem in that the decomposition products deteriorate the brazeability. In particular, because an inflow of the atmosphere from the external space and an outflow of the atmosphere to the external space tend not to occur at an inner join part that faces a hollow portion, decomposition products of the binder tend to remain in the hollow portion, thereby readily deteriorating the brazeability of the inner join part.

With regard to this, because the brazing method does not necessarily require the flux to be uniformly applied, it is not necessary to use any binder. Thus, by restricting the content of the binder to 20 mass % or less, it is possible to prevent degradation in brazeability due to the decomposition products of the binder, and to further improve the brazeability of both the outer join part and the inner join part.

WORKING EXAMPLES

Example 1

Figure 2A:
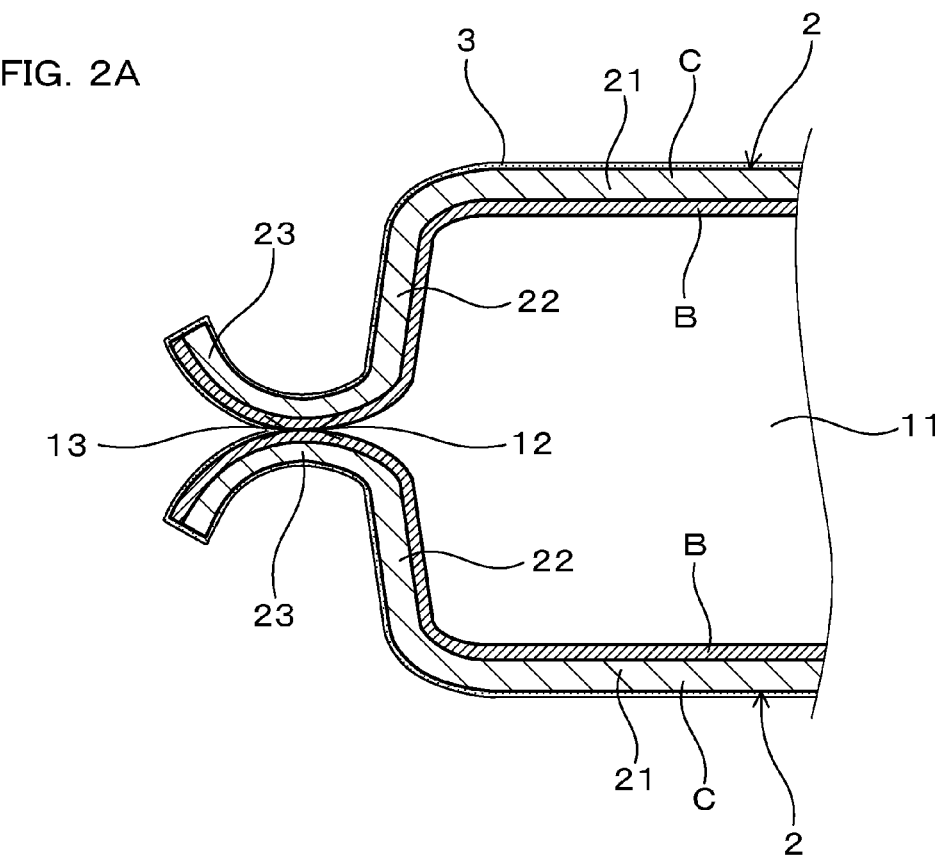
FIG. 2 is a partially enlarged sectional view of the vicinity of join parts: (a) prior to brazing; and (b) after completion of brazing in Example 1.

Working examples of the brazing method will be explained with reference to the drawings. An object to be processed 1 of the present example is constituted from two brazing sheets 2 as shown in FIGS. 1 and 2, and a tube-shaped hollow portion 11 surrounded by the two brazing sheets 2 is present. The brazing sheet 2 of the present example is a single-sided brazing sheet in which a filler metal layer B is clad onto one surface of a core layer C as shown in FIG. 2(a). Each brazing sheet 2 has a top wall 21, and a pair of side walls 22 that are formed by folding the top wall 21 at both ends thereof in the sheet width direction. The pair of side walls 22 extend from the ends of the top wall 21 toward the filler metal layer B side in the thickness direction of the top wall 21. In addition, at a tip end of each side wall 22, a flange part 23 is formed by folding back the brazing sheet 2 towards the top wall 21 side.

The two brazing sheets 2 are disposed such that the filler metal layers B of the top walls 21 face with each other, and the flange parts 23 are in contact with each other. The object to be processed 1 of the present example includes the tube-shaped hollow portion 11 surrounded by the two brazing sheets 2 as shown in FIGS. 1 and 2(a). Moreover, the flange part 23 has an inner join part 12 located on the hollow portion 11 side, and an outer join part 13 located on the side that faces the external space.

Figure 2B:
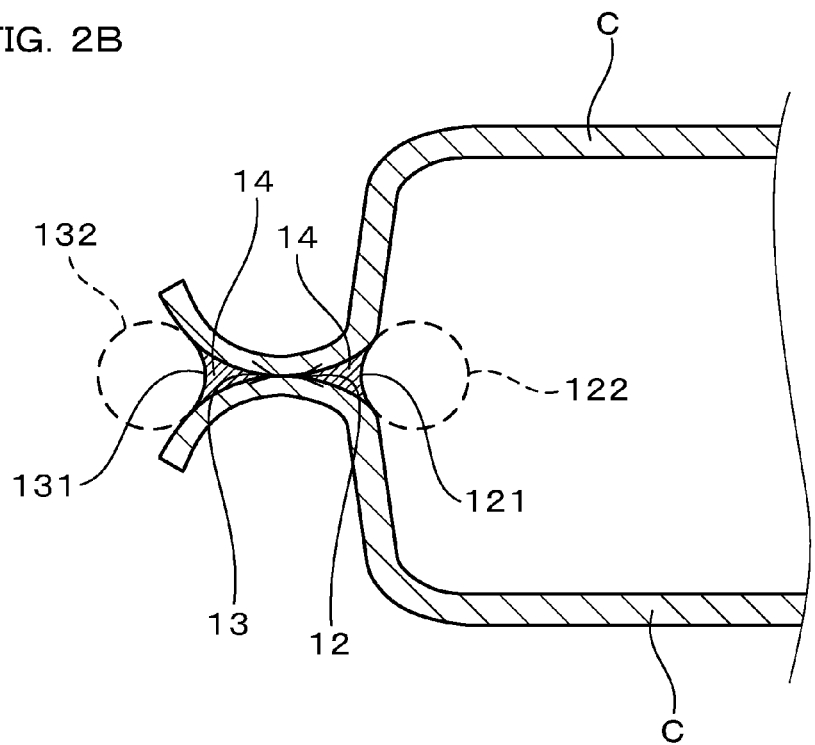

After a flux 3 is applied to the outer join part 13 of the object to be processed 1 configured as mentioned above, the object to be processed 1 is heated in an inert gas atmosphere and brazed. Thus, as shown in FIG. 2(b), a brazed portion 14 is formed at both the inner join part 12 and the outer join part 13, thereby brazing the two brazing sheets 2.

In the present example, a brazeability evaluation of the objects to be processed 1 that were produced using the brazing sheets 2, in which the chemical compositions of the filler metal layer B and the core layer C were variously changed as indicated in Tables 1 and 2, was conducted. Hereinafter, the experiments will be described in detail.

[Preparation of Brazing Sheet 2]

Aluminum alloys having the chemical compositions listed in Table 1 were cast into ingots. After the ingots were heated at 500° C. and subjected to homogenization treatment, hot rolling was performed on the ingots to prepare filler metal plates having a thickness of 5 mm. In addition, separately from the filler metal plates, aluminum alloys having the chemical compositions listed in Table 2 were cast into ingots. After the ingots were heated at 600° C. and subjected to a homogenization treatment, hot rolling was performed on the ingots to prepare core material plates having a thickness of 45 mm.

Each filler metal plate and each core material plate, which were prepared as described above, were overlaid in the combinations listed in Table 3, and then subjected to clad rolling at a temperature of 500° C. to prepare a clad-rolled sheet having a thickness of 2 mm. Next, each resulting clad-rolled sheet was subjected to cold rolling to prepare a cold-rolled sheet having a thickness of 0.4 mm. The cold-rolled sheet was heated and an annealing treatment was performed. As described above, brazing sheets 2 were prepared in which the filler metal layer B was clad onto one side of the core layer C. The cladding percentage of the filler metal layer B in the resulting brazing sheets 2 was 10%.

[Assembly of Object to be Processed 1]

After press molding was performed on the brazing sheets 2 and the shapes shown in FIGS. 1 and 2 were formed, the two brazing sheets 2 were combined such that the filler metal layers B of the flange parts 23 were in contact with each other as shown in FIG. 2(a). In this state, the two brazing sheets 2 were fixed with a jig (not shown) to assemble an object to be processed 1.

[Application of Flux 3]

Next, to prevent the flux 3 from entering into the interior of the hollow portion 11, tape (not shown) was attached to the pair of opening ends 111 of the objects to be processed 1 (refer to FIG. 1) to temporarily seal the hollow portion 11. In this state, an alcohol suspension of K—Al—F based flux was applied by spraying onto the outer surface of the object to be processed 1, that is, the entire surface that faces the external space. Then, the object to be processed 1 was dried and thereafter the tape was removed. As described above, the flux 3 was applied to the outer surface of the objects to be processed 1.

The application amount of the flux 3 was calculated in the following way. First, the total application mass (g) of the flux 3 was calculated by subtracting the mass of the object to be processed 1 measured in advance before applying the flux 3 from the mass of the object to be processed 1 measured after drying. By dividing the total mass by the total area ($m^2$) of the outer surface of the object to be processed 1, the average application amount of the flux 3 applied to the object to be processed 1 can be calculated. In the present example, this average application amount was defined to be the amount of the flux 3 applied to the outer join part 13.

In the present example, in consideration of application unevenness of the flux 3, application conditions such as the concentration of the flux 3 in the alcohol suspension were set to adjust the average application amount to be 2.5 $g/m^2$. However, the average application amount of the flux 3 actually fluctuated within a range of 1.0 to 4.5 $g/m^2$ as shown in Table 3.

[Brazing]

For brazing the object to be processed 1, a brazing furnace in which the atmosphere in a brazing chamber is replaceable with an inert gas was employed. In the present example, nitrogen gas was introduced into the brazing chamber to control the oxygen concentration in the chamber to be 20 ppm or less, and under such conditions, brazing of the object to be processed 1 was performed.

The object to be processed 1 was heated under the following conditions. The object to be processed 1 was placed in the brazing chamber, and then heated while the temperature of the object to be processed 1 was being measured, such that the time until the temperature reached 600° C. was approximately 15 minutes. After the temperature of the object to be processed 1 reached 600° C., the temperature of 600° C. was maintained for 3 minutes. Subsequently, the object to be processed 1 was cooled and then taken out of the brazing furnace. The brazing of the objects to be processed 1 was thus completed, and 33 specimens (specimens E1 to E23, and C1 to C10) listed in Table 3 were prepared.

[Evaluation of Brazeability]

For the resulting specimens, the brazeability evaluation was conducted by visual evaluation and by cross-section observation. Hereinafter, the evaluation methods will be explained.

<Visual Evaluation>

The shapes of fillets 121 and 131 (refer to FIG. 2(b)), which were formed at the inner join parts 12 and the outer join parts 13 of the specimens, were visually observed. The observation results are indicated in Table 3. It is noted that the symbols entered in the "visual evaluation" column in Table 3 indicate the evaluation results as follows.

A+: Very good state in which the variations in size of the fillets 121/131 are small, and there is no discontinuity in the fillets 121/131.

A: Good state in which, although there are slight variations in the size of the fillets 121/131, there is no discontinuity in the fillets 121/131.

B: Non-continuous state in which the fillets 121/131 are partially torn.

C: State in which the fillets 121/131 were scarcely formed, or no brazed joint was formed.

<Cross-Section Observation>

Each specimen was cut to expose a cross section perpendicular to the longitudinal direction and images of the formed fillets 121 and 131 were obtained in the cross section. Based on these images, radii of curvature were calculated assuming the fillets 121 and 131 are circular arcs as shown in FIG. 2(b). That is, as shown in FIG. 2(b), based on these cross section images, the approximate circles 122 and 132 that best match the shapes of the fillets 121 and 131 were determined, and the radii of the approximate circles 122 and 132 thus determined were defined as the radii of curvature. It is noted that the radii of curvature of the fillets 121 and 131 exhibited larger values when the brazeability is more satisfactory and the wettability of the filer metal during brazing is higher.

TABLE 1

| Alloy Symbol | Chemical Composition (mass %) | | | | | |
|---|---|---|---|---|---|---|
| | Si | Li | Be | Bi | Mg | Al |
| A1 | 10 | 0.002 | — | 0.01 | <0.01 | bal. |
| A2 | 10 | 0.004 | — | 0.01 | <0.01 | bal. |
| A3 | 10 | 0.006 | — | 0.01 | <0.01 | bal. |
| A4 | 10 | 0.02 | — | 0.03 | <0.01 | bal. |
| A5 | 10 | 0.04 | — | 0.03 | <0.01 | bal. |
| A6 | 10 | 0.08 | — | 0.05 | <0.01 | bal. |
| A7 | 10 | 0.1 | — | 0.05 | <0.01 | bal. |
| A8 | 10 | — | 0.004 | 0.02 | <0.01 | bal. |
| A9 | 10 | — | 0.006 | 0.02 | <0.01 | bal. |
| A10 | 10 | — | 0.008 | 0.03 | <0.01 | bal. |
| A11 | 10 | — | 0.02 | 0.03 | <0.01 | bal. |
| A12 | 10 | — | 0.04 | 0.03 | <0.01 | bal. |
| A13 | 10 | — | 0.08 | 0.15 | <0.01 | bal. |
| A14 | 10 | — | 0.12 | 0.15 | <0.01 | bal. |
| A15 | 10 | — | 0.15 | 0.02 | <0.01 | bal. |
| A16 | 10 | 0.01 | 0.02 | 0.02 | <0.01 | bal. |
| A17 | 10 | 0.02 | 0.04 | 0.02 | <0.01 | bal. |
| A18 | 10 | 0.04 | 0.01 | 0.02 | <0.01 | bal. |
| A19 | 10 | 0.04 | 0.01 | 0.005 | <0.01 | bal. |
| A20 | 10 | 0.04 | 0.01 | 0.3 | <0.01 | bal. |
| A21 | 10 | 0.04 | 0.01 | 0.5 | <0.01 | bal. |
| A22 | 3 | 0.04 | — | 0.05 | <0.01 | bal. |
| A23 | 4 | 0.04 | — | 0.05 | <0.01 | bal. |
| A24 | 7.5 | 0.04 | — | 0.05 | <0.01 | bal. |
| A25 | 13 | 0.04 | — | 0.05 | <0.01 | bal. |
| A26 | 15 | 0.04 | — | 0.05 | <0.01 | bal. |
| A27 | 10 | 0.04 | — | 0.05 | 0.01 | bal. |
| A28 | 10 | 0.04 | — | 0.05 | 0.04 | bal. |

TABLE 1-continued

| Alloy | Chemical Composition (mass %) | | | | | |
|---|---|---|---|---|---|---|
| Symbol | Si | Li | Be | Bi | Mg | Al |
| A29 | 10 | 0.04 | — | 0.05 | 0.08 | bal. |
| A30 | 10 | 0.04 | — | 0.05 | 0.12 | bal. |

TABLE 2

| Alloy | Chemical Composition (mass %) | | | | | |
|---|---|---|---|---|---|---|
| Symbol | Mn | Cu | Si | Fe | Mg | Al |
| B1 | 1.1 | 0.15 | 0.30 | 0.4 | <0.01 | bal. |
| B2 | 1.1 | 0.15 | 0.30 | 0.4 | 0.05 | bal. |
| B3 | 1.1 | 0.15 | 0.30 | 0.4 | 0.18 | bal. |
| B4 | 1.1 | 0.15 | 0.30 | 0.4 | 0.23 | bal. |
| B5 | <0.01 | 0.01 | 0.15 | 0.3 | 0.01 | bal. |

TABLE 3

| | Brazing Sheet 2 | | Visual Evaluation | | Radius of Curvature (mm) | |
|---|---|---|---|---|---|---|
| Specimens No. | Filler Metal Layer B | Core Layer C | Inner Join Part 12 | Outer Join Part 13 | Inner Join Part 12 | Outer Join Part 13 |
| E1 | A2 | B1 | A | A+ | 0.35 | 0.50 |
| E2 | A3 | B1 | A+ | A+ | 0.45 | 0.50 |
| E3 | A4 | B1 | A+ | A+ | 0.50 | 0.50 |
| E4 | A5 | B1 | A+ | A+ | 0.50 | 0.50 |
| E5 | A6 | B1 | A | A+ | 0.35 | 0.50 |
| E6 | A9 | B1 | A | A+ | 0.30 | 0.50 |
| E7 | A10 | B1 | A+ | A+ | 0.45 | 0.50 |
| E8 | A11 | B1 | A+ | A+ | 0.45 | 0.50 |
| E9 | A12 | B1 | A+ | A+ | 0.45 | 0.50 |
| E10 | A13 | B1 | A | A+ | 0.35 | 0.50 |
| E11 | A14 | B1 | A | A+ | 0.30 | 0.50 |
| E12 | A16 | B1 | A+ | A+ | 0.45 | 0.50 |
| E13 | A17 | B1 | A+ | A+ | 0.50 | 0.50 |
| E14 | A18 | B1 | A+ | A+ | 0.50 | 0.50 |
| E15 | A20 | B1 | A+ | A+ | 0.30 | 0.50 |
| E16 | A23 | B1 | A | A | 0.25 | 0.25 |
| E17 | A24 | B1 | A+ | A+ | 0.35 | 0.35 |
| E18 | A25 | B1 | A+ | A+ | 0.40 | 0.40 |
| E19 | A27 | B2 | A+ | A+ | 0.50 | 0.50 |
| E20 | A27 | B3 | A+ | A | 0.45 | 0.40 |
| E21 | A27 | B5 | A+ | A+ | 0.45 | 0.45 |
| E22 | A28 | B1 | A+ | A+ | 0.50 | 0.50 |
| E23 | A29 | B1 | A+ | A | 0.50 | 0.40 |
| C1 | A1 | B1 | C | A+ | 0.00 | 0.50 |
| C2 | A7 | B1 | B | A+ | 0.20 | 0.50 |
| C3 | A8 | B1 | C | A+ | 0.00 | 0.50 |
| C4 | A15 | B1 | B | A+ | 0.20 | 0.50 |
| C5 | A19 | B1 | B | A+ | 0.25 | 0.50 |
| C6 | A21 | B1 | B | A+ | 0.20 | 0.50 |
| C7 | A22 | B1 | B | B | 0.15 | 0.10 |
| C8 | A26 | B1 | B | B | 0.10 | 0.15 |
| C9 | A30 | B1 | A | C | 0.40 | 0.00 |
| C10 | A27 | B4 | B | C | 0.25 | 0.00 |

As can be understood from Tables 1 to 3, specimens E1 to E23 used brazing sheet 2 in which the chemical compositions of the filler metal layers B and the core layers C were within the above-specified ranges. Therefore, specimens E1 to E23 exhibited excellent evaluation results in both visual evaluation and cross-section observation. It is noted that specimen E15 became discolored at the surface of the brazed portion 14. This is considered to be due to a relatively large Bi content. Because the results of the visual evaluation and the cross-section observation in specimen E15 are excellent, there is no risk that the discoloration of the brazed portion 14 will lead to any practical problem in specimen E15.

On the other hand, specimens C1 to C6 used brazing sheets 2 in which any one of Bi, Li and Be in the filler metal layers B deviated from the above-specified ranges. For that reason, brazing failures such as tearing of fillets and non-joining occurred in the inner join parts 12. In view of the fact that the radii of curvature of the fillets 121 in the inner join parts 12 in specimens C1 to C6 were small, it is presumed that deterioration of the wettability in the filler metal at the inner join parts 12 was caused because any one of Bi, Li and Be deviated from the above-described specific ranges.

Specimens C7 to C8 used brazing sheets 2 in which the Si content in the filler metal layers B deviated from the above-specified ranges. For that reason, the fluidity of the filler metal during brazing became insufficient, and brazing failures occurred in both the inner join parts 12 and the outer join parts 13.

Specimens C9 to C10 used brazing sheets 2 in which the Mg content in the filler metal layers B or the core layers C exceeded the above-specified ranges. For that reason, brazing failures occurred at the outer join parts 13. In view of the fact that the radii of curvature of the fillets 131 in the outer join parts 13 in specimens C9 to C10 was small, it is presumed that deterioration of wettability in the filler metal at the outer join parts 13 was caused because the flux 3 reacted with Mg and was thereby consumed.

Example 2

Figure 3:
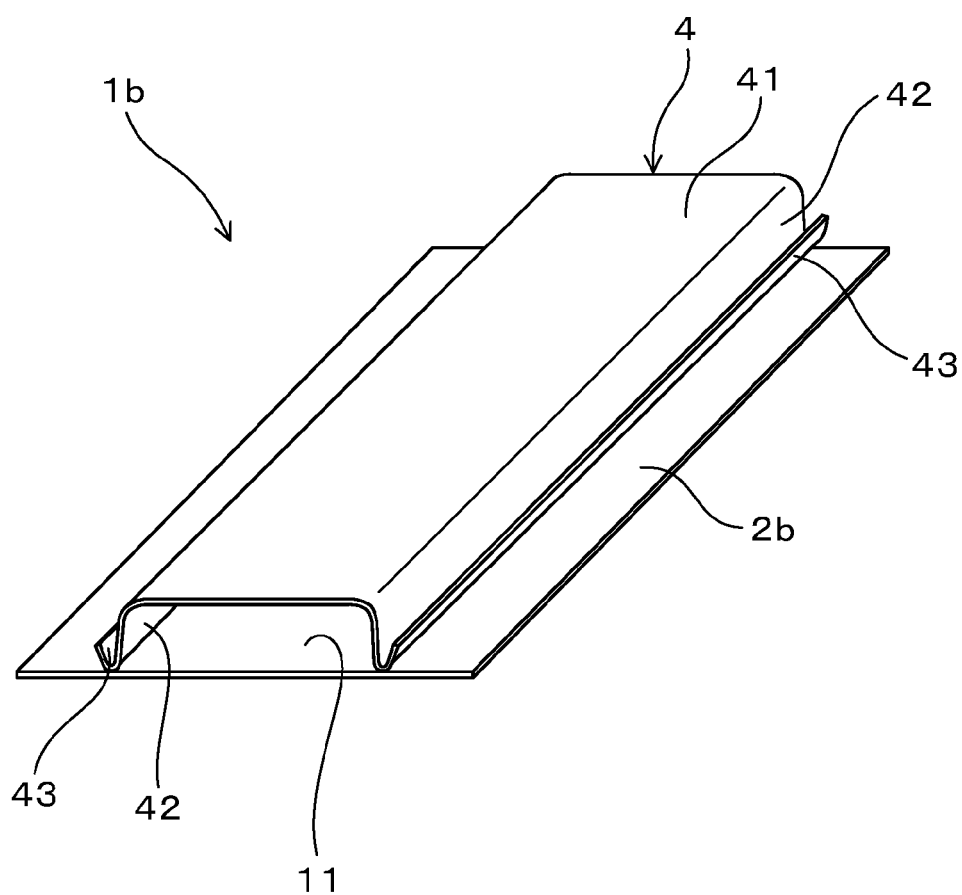
FIG. 3 is a perspective view of an object to be processed prior to brazing according to Example 2.

The present example is an example of the brazing method of an object to be processed 1b that includes another component other than the brazing sheet 2. The object to be processed 1b of the present example, as shown in FIGS. 3 and 4, was constituted from a planar brazing sheet 2b and an upper component 4 placed on the brazing sheet 2b, and there was a tube-shaped hollow portion 11 surrounded by the brazing sheet 2b and the upper component 4. It is noted that the reference numbers used in FIGS. 3 and 4 are the same as were used in Example 1 to indicate the same structural elements, etc. except as otherwise explained.

The upper component 4 was formed by folding an aluminum sheet of 0.4 mm thickness made of JIS A 3003 alloy, and had a similar shape to that of the brazing sheet 2 in Example 1. That is, as shown in FIGS. 3 and 4, the upper component 4 includes a top wall 41, a pair of side walls 42 that are formed by folding the top wall 41 at both ends thereof in the width direction, and flange parts 43 formed at the tip ends of the side walls 42.

The brazing sheet 2b has the same configuration as those used in specimens E2 and E4 in Example 1. The brazing sheet 2 of the present example has a size of 50 mm in width and 100 mm in length.

Figure 4A:
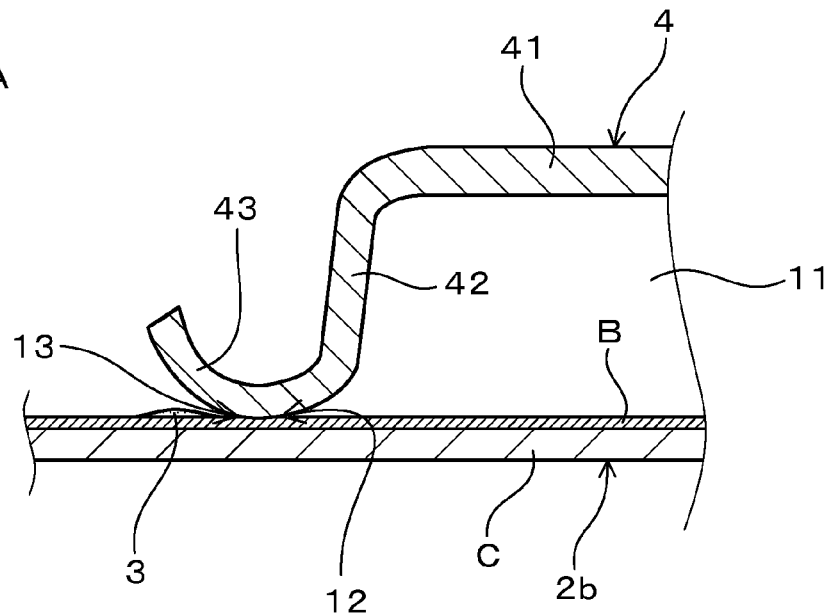
FIG. 4 is a partially enlarged sectional view of the vicinity of join parts: (a) prior to brazing; and (b) after completion of brazing according to Example 2.
Figure 4B:
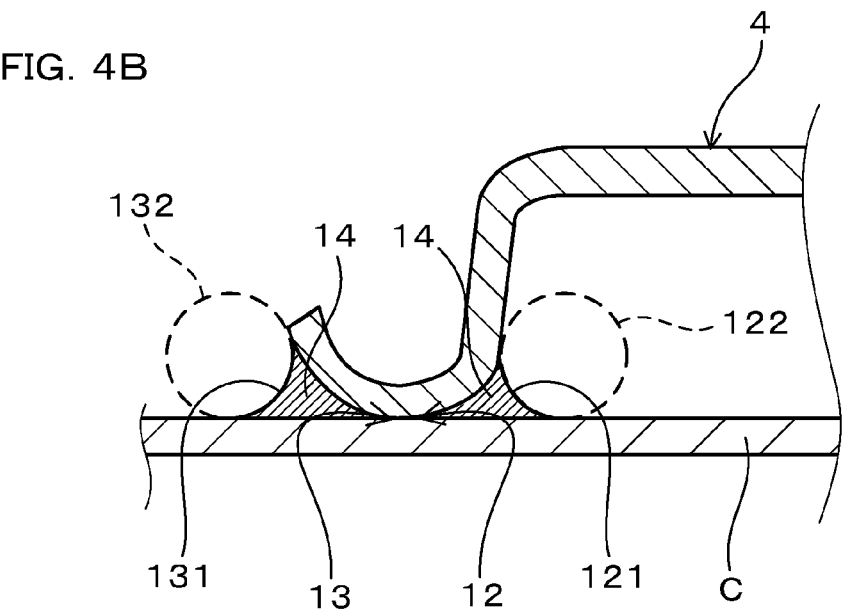

In the present example, before the object to be processed 1b was assembled, the flux 3 was applied to the portion that becomes the outer join part 13 on the filler metal layer B of the brazing sheet 2b (refer to FIG. 4(a)). Specifically, two kinds of alcohol suspensions of the flux 3 having different concentrations were prepared, applied using a brush, and thereafter dried such that the average application amounts of these two kinds of flux 3 were respectively 1.5 g/m² and 3.5 g/m².

In the method of the present example, there is a problem, such as the total amount of the flux 3 to be applied is smaller than in the method of applying to the entire surface of the object to be processed 1 as in Example 1, and it is difficult to calculate the application surface area; it is difficult to accurately calculate the application amount by using the actual brazing sheet 2b having the flux actually applied. Therefore, in the present example, experimental applications were preliminarily performed multiple times using the above-mentioned two kinds of alcohol suspensions, and then the experiments were conducted under the assumption that the amount to be applied to the brazing sheet 2b for brazing falls in a range from the minimum value to the maximum value in the experimental applications that were performed multiple times. Table 4 shows the range from the minimum value to the maximum value in the experimental applications.

After the flux 3 was applied to the brazing sheet 2b, the upper component 4 was placed such that the flange part 43 was in contact with the filler metal layer B (refer to FIG. 4(a)). In this state, the brazing sheet 2b and the upper component 4 were fixed with a jig to assemble the object to be processed 1b. The object to be processed 1b of the present example includes the tube-shaped hollow portion 11 surrounded by the brazing sheet 2b and the upper component 4 as shown in FIGS. 3 and 4(a). In addition, the flange part 43 has an inner join part 12 located on the hollow portion 11 side, and an outer join part 13 located on the side that faces the external space.

Thereafter, brazing was performed in the same way as in Example 1 to prepare four specimens (specimens E31 to E34) shown in Table 4. Moreover, in the present example, for the sake of comparison with specimens E31 to E34, two specimens (specimens C31 and C32), which were prepared in the same way as described above except that the flux 3 was not applied at all, were prepared. The brazeability of the six specimens was evaluated in the same way as in Example 1, and the results are shown in Table 4.

TABLE 4

| Specimens No. | Brazing Sheet 2b | | Flux 3 Appli- cation Amount (g/m²) | Visual Evaluation | | Radius of Curvature (mm) | |
|---|---|---|---|---|---|---|---|
| | Filler Metal Layer B | Core Layer C | | Inner Join Part 12 | Outer Join Part 13 | Inner Join Part 12 | Outer Join Part 13 |
| E31 | A3 | B1 | 0.5~2.5 | A+ | A+ | 0.40 | 0.55 |
| E32 | A3 | B1 | 2.5~4.5 | A+ | A+ | 0.50 | 0.60 |
| E33 | A5 | B1 | 0.5~2.5 | A+ | A+ | 0.40 | 0.55 |
| E34 | A5 | B1 | 2.5~4.5 | A+ | A+ | 0.50 | 0.60 |
| C31 | A3 | B1 | 0.0 | A+ | B | 0.40 | 0.15 |
| C32 | A5 | B1 | 0.0 | A+ | B | 0.35 | 0.20 |

As can be understood from Table 4, specimens E31 to E34, in which the flux 3 was applied to the outer join parts 13, exhibited excellent results in both the visual evaluation and the cross-section observation. On the other hand, in specimens C31 and C32, which were prepared without applying the flux 3, brazing failures occurred in the outer join parts 13. From these results, it can be seen that it is difficult to attain the effect of improved brazeability in the outer join part 13 by the Bi, Li and Be contained in the filler metal layer B, and the flux 3 is indispensable.

Example 3

Figure 5:
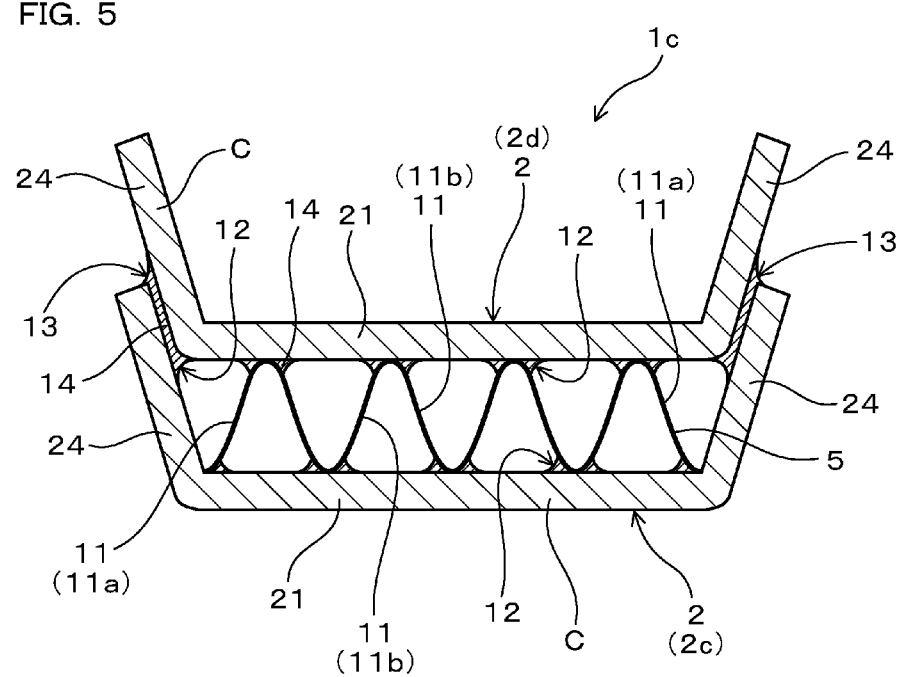
FIG. 5 is a sectional view of an object to be processed after completion of brazing according to Example 3, in which a fin is interposed between two brazing sheets.
Figure 6:
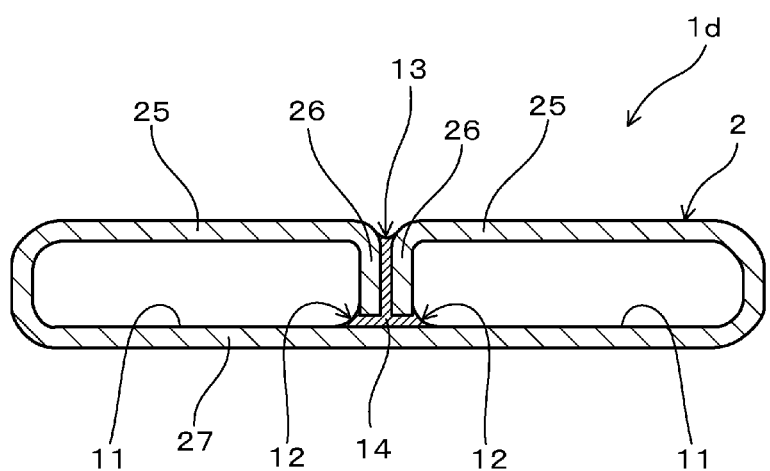
FIG. 6 is a sectional view of an object to be processed after completion of brazing according to Example 3, the object including a single brazing sheet with two hollow portions.
Figure 7:
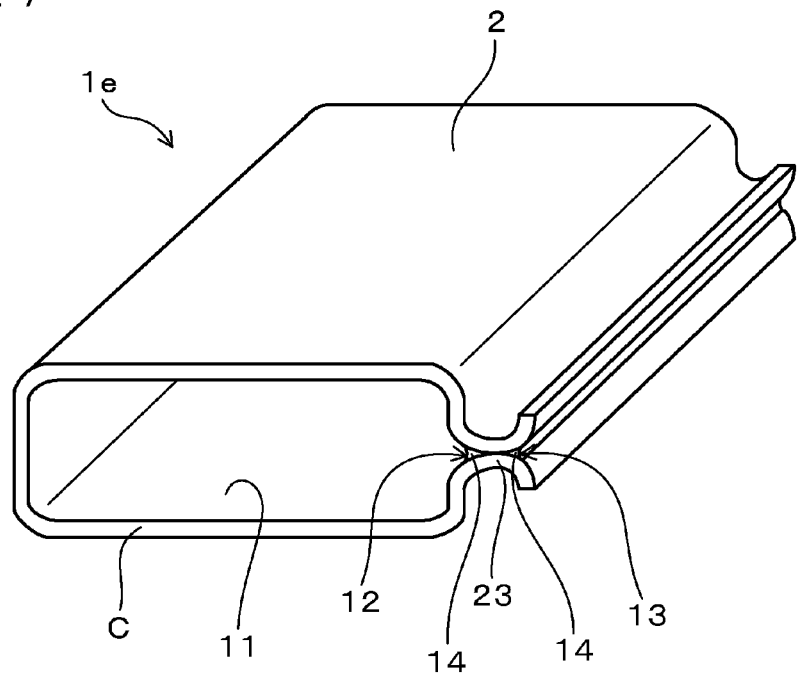
FIG. 7 is a perspective view of an object to be processed after completion of brazing according to Example 3, the object including a single brazing sheet with one hollow portion.

The present example is an example of another configuration of the object to be processed 1 to which the brazing method is applicable. The brazing method can be applied to objects to be processed 1 of a variety of modes, provided that the object to be processed 1 is composed of aluminum material and has a hollow portion 11. FIGS. 5 to 7 show examples of such configurations of the objects to be processed 1 (1c, 1d, and 1e). It is noted that FIGS. 5 to 7 show the state in which brazing of the object to be processed 1 has been completed. The filler metal layer B in the brazing sheets 2 is melted by heating during the brazing and moves to an inner join part 12 and to an outer join part 13. For that reason, as shown in FIGS. 5 to 7, no filler metal layer B remains on the surface of the core layer C in the state in which brazing has been completed, except on the inner join part 12 and the outer join part 13.

For example, the object to be processed 1 may have an inner fin 5 interposed between two brazing sheets 2 as shown in FIG. 5. The object to be processed 1c in FIG. 5 can be produced using a double-sided brazing sheet in which filler metal layers B are clad onto both sides of a core layer C.

The object to be processed 1c can be produced, for example, in the following way. First, both end parts of the brazing sheet 2 in the sheet width direction are bent to form a top wall 21 and a pair of tapered side walls 24. The tapered side walls 24 are bent such that the distance therebetween becomes larger moving away from the top wall 21. Next, a separately-prepared inner fin 5 having a corrugated shape is housed inside one brazing sheet 2c of the two brazing sheets 2 (2c and 2d) that will be brought into contact with the filler metal layer B of the top wall 21. Thereafter, the top wall 21 of the other brazing sheet 2d is housed inside the brazing sheet 2c to bring the filler metal layer B into contact with the inner fin 5, and bring the tapered side walls 24 of the two brazing sheets 2 into contact with each other.

The resulting object to be processed 1c includes a plurality of hollow portions 11 (11a and 11b) between the two brazing sheets 2. That is, there are tube-shaped hollow portions 11a surrounded by the top wall 21, the tapered side wall 24, and the inner fin 5 at each end of the top wall 21 in the sheet width direction. Moreover, inwardly from the hollow portion 11a in the sheet width direction, there are tube-shaped hollow portions 11b surrounded by the top walls 21 and the inner fin 5.

Because contact parts between the brazing sheets 2 and the inner fins 5 are inner join parts 12 that face the hollow portions 11a or 11b, satisfactory brazed joints can be formed without using a flux 3. On the other hand, contact parts between the tapered side wall 24 of one of the brazing sheets 2 and the tapered side wall 24 of the other brazing sheet 2 include outer join parts 13 that face the external space. Therefore, satisfactory brazed joints can be formed by applying the flux 3 onto the outer surfaces of the contact parts between the tapered side walls 24.

In addition, the object to be processed 1 may be a tube-shaped body that is formed by folding a single brazing sheet 2. For example, the object to be processed 1d shown in FIG. 6 can be produced by folding back both end parts of the brazing sheet 2 in the sheet width direction toward the center to form folded parts 25, and further folding back each tip end thereof inwardly to form a center wall 26. As a result, the center walls 26, the folded parts 25 connected to the center walls 26, and a base part 27 that faces the folded parts 25 are formed.

The object to be processed 1d thus produced includes two hollow portions 11 each surrounded by a center wall 26, a folded part 25, and the base part 27. Moreover, the portions where the base part 27 and the center walls 26 are joined are inner join parts 12, and the portion where the pair of the center walls 26 is joined is an outer join part 13.

As another aspect of the object to be processed 1 that is formed by folding a single brazing sheet 2, an object to be processed 1e is conceivable, as shown in FIG. 7, in which flange parts 23 are formed at both end parts of the brazing sheet 2 in the sheet width direction, and the brazing sheet 2 is formed into a tubular shape such that the flange parts 23 are brought into contact with each other.

The configurations of the object to be processed 1 enumerated above are exemplary, and the brazing method is applicable to any object to be processed 1 provided that the object is composed of aluminum material and includes a hollow portion 11.

Example 4

Figure 8:
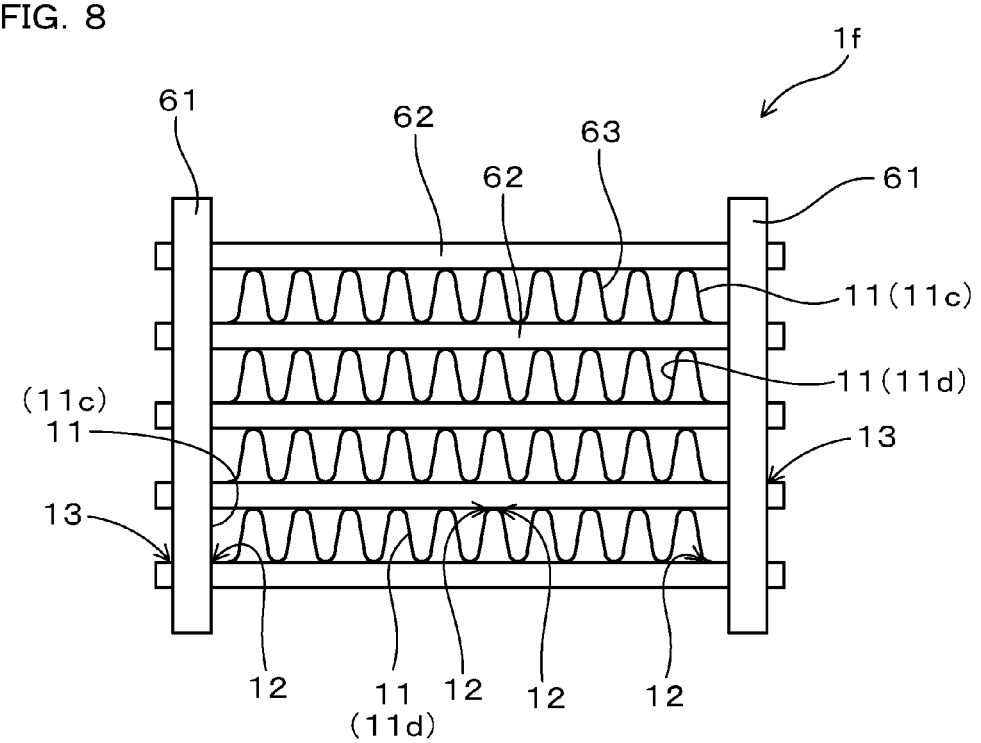
FIG. 8 is a plan view of an object to be processed according to Example 4, the object including headers, fins, and tubes.

The brazing method is applicable to the manufacture of a heat exchanger. As shown in FIG. 8, an object to be processed if of the present example includes one pair of headers 61, five extruded pipes 62 arranged in parallel with each other and inserted into the headers 61, and outer fins 63 having a corrugated shape and disposed between adjacent extruded pipes 62.

The object to be processed if includes a large number of hollow portions 11 (11c and 11d). That is, as shown in FIG. 8, on both sides in the object to be processed if in the arrangement direction of the headers 61, there are hollow portions 11c each surrounded by a header 61, an extruded pipe 62 and an outer fin 63. Moreover, inwardly from the hollow portions 11c in the arrangement direction, there are hollow portions 11d each surrounded by an extruded pipe 62 and an outer fin 63.

The object to be processed if can form a heat exchanger by performing the brazing method after assembling the headers 61, the extruded pipes 62 and the outer fins 63 into the predetermined shape as shown in FIG. 8.

As the extruded pipes 62, for example, multi-hole pipes, the interiors of which are sectioned into multiple flow passages by partition walls, can be used. The headers 61 and the outer fins 63 are constituted from brazing sheets 2 having filler metal layers B clad onto both sides of the core layer C. Moreover, the headers 61 have through holes (not shown) through which the extruded pipes 62 pass.

As shown in FIG. 8, the object to be processed if of the present example has a large number of the hollow portions 11. Because the contact parts between the extruded pipes 62 and the outer fins 63 correspond to inner join parts 12 that face the hollow portions 11c or 11d, satisfactory brazed joints can be formed without using a flux 3. On the other hand, the contact parts between the headers 61 and the extruded pipes 62 correspond to outer join parts 13 that face the external space. Therefore, by applying the flux 3 to the outer surface of the contact parts between the headers 61 and the extruded pipes 62, satisfactory brazed joints can be formed.

The invention claimed is:

1. A brazing method for brazing an object, which is composed of an aluminum material and has a hollow portion, to form an inner brazed joint that faces the hollow portion and also an outer brazed joint that faces an external space, the brazing method comprising:
    preparing the object such that it comprises a brazing sheet including:
    a core layer having a chemical composition in which Mg is less than 0.2% (mass %, likewise hereinbelow), the remainder being composed of Al and unavoidable impurities; and
    a filler metal layer having a chemical composition that indispensably contains Si: 4.0 to 13.0% and Bi: 0.01 to 0.3%, and further contains at least one element selected from the group consisting of Li: 0.004 to 0.08% and Be: 0.006 to 0.12%, Mg being less than 0.1% and the remainder being composed of Al and unavoidable impurities, the filler metal layer being clad onto at least one side of the core layer;
    arranging the object such that the filler metal layer is present at a first location that will form the inner brazed joint and at a second location that will form the outer brazed joint;
    next, applying a flux onto the filler metal layer that is present at the second location that will form the outer brazed joint; and
    subsequently, heating and brazing the object in an inert gas atmosphere.

2. The brazing method according to claim 1, wherein the core layer further contains at least one element selected from the group consisting of Mn: 0.05 to 1.3%, Si: 1.0% or less, Fe: 1.0% or less, Cu: 0.9% or less, Zn: 6.5% or less, Ti: 0.2% or less, and Zr: 0.5% or less.

3. The brazing method according to claim 1, wherein, prior to the flux application step, the brazing sheet is etched to remove an oxide film present on a surface of the filler metal layer.

4. The brazing method according to claim 3, wherein after the etching but before the heating and brazing, an oil solution is applied to the surface of the filler metal layer, the oil solution having a thermal decomposition temperature of 380° C. or lower in an inert gas.

5. The brazing method according to claim 1, wherein the flux contains 20 mass % or less of a binder having a thermal decomposition temperature of 500° C. or lower in an inert gas.

6. The brazing method according to claim 1, wherein in the flux application step, 0.5 to 7.0 g/m$^2$ of the flux is applied to the filler metal layer at the second location that will form the outer brazed joint.

7. The brazing method according to claim 1, wherein the object is a hollow aluminum structure that is formed into a heat exchanger after the brazing.

8. The brazing method according to claim 1, wherein no flux is applied to the first location of the object prior to heating and brazing the object.

9. The brazing method according to claim 1, wherein the filler metal layer contains:
    0.006 to 0.04% Li and/or 0.008 to 0.04% Be; and
    0.05% or less Mg.

10. The brazing method according to claim 9, wherein:
    the core layer further contains Mn: 0.05 to 1.3%, Si: 1.0% or less, Fe: 1.0% or less, and Cu: 0.9% or less;
    the object is a heat exchanger; and
    at least the core layer of the at least one brazing sheet is formed as a fin of the heat exchanger.

11. A method for brazing a hollow aluminum structure to form both an interior brazed joint that faces an interior hollow space of the hollow aluminum structure and an exterior brazed joint that faces a space external to the interior hollow space,
    wherein, prior to brazing, the hollow aluminum structure includes at least one brazing sheet having a filler metal layer clad onto at least one side of a core layer, the core layer being composed of aluminum or an aluminum alloy containing less than 0.2 mass % Mg (mass %, likewise hereinbelow), and the filler metal layer being composed of an aluminum alloy that contains Si: 4.0-13.0 mass % and Bi: 0.01-0.3 mass %, and further contains at least one element selected from the group consisting of Li: 0.004-0.08 mass % and Be: 0.006-0.12 mass %, the filler metal layer containing less than 0.1 mass % Mg, the method comprising:

arranging the hollow aluminum structure such that the filler metal layer of the at least one brazing sheet is present at a first location that will form the interior brazed joint and at a second location that will form the exterior brazed joint;

thereafter, applying a flux onto the filler metal layer at the second location that will form the exterior brazed joint; and subsequently, heating and brazing the hollow aluminum structure in an inert gas atmosphere to form the interior brazed joint and the exterior brazed joint.

12. The brazing method according to claim 11, wherein the core layer further contains at least one element selected from the group consisting of Mn: 0.05 to 1.3 mass %, Si: 1.0 mass % or less, Fe: 1.0 mass % or less, Cu: 0.9 mass % or less, Zn: 6.5 mass % or less, Ti: 0.2 mass % or less, and Zr: 0.5 mass % or less.

13. The brazing method according to claim 11, wherein, prior to applying the flux, the brazing sheet is etched to remove an oxide film present on a surface of the filler metal layer.

14. The brazing method according to claim 13, wherein after the etching but before the heating and brazing, an oil solution is applied to the surface of the filler metal layer, the oil solution having a thermal decomposition temperature of 380° C. or lower in an inert gas.

15. The brazing method according to claim 11, wherein the flux contains 20 mass % or less of a binder having a thermal decomposition temperature of 500° C. or lower in an inert gas.

16. The brazing method according to claim 11, wherein 0.5 to 7.0 g/m$^2$ of the flux is applied onto the filler metal layer at the second location that will form the exterior brazed joint.

17. The brazing method according to claim 11, wherein the hollow aluminum structure is a heat exchanger and at least the core layer of the at least one brazing sheet is formed as a fin of the heat exchanger.

18. The brazing method according to claim 11, wherein no flux is applied to the first location of the hollow aluminum structure prior to heating and brazing the hollow aluminum structure.

19. The brazing method according to claim 18, wherein the filler metal layer contains:
0.006 to 0.04% Li and/or 0.008 to 0.04% Be; and
0.05% or less Mg.

20. The brazing method according to claim 19, wherein:
the core layer further contains Mn: 0.05 to 1.3%, Si: 1.0% or less, Fe: 1.0% or less, and Cu: 0.9% or less;
the object is a heat exchanger; and
at least the core layer of the at least one brazing sheet is formed as a fin of the heat exchanger.

* * * * *